(12) United States Patent
Hay et al.

(10) Patent No.: US 9,671,500 B1
(45) Date of Patent: Jun. 6, 2017

(54) SYSTEMS AND METHODS FOR LOCATING A VEHICLE

(71) Applicant: GENERAL MOTORS LLC, Detroit, MI (US)

(72) Inventors: Curtis Hay, West Bloomfield, MI (US); Paul K. Wagner, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/978,041

(22) Filed: Dec. 22, 2015

(51) Int. Cl.
*G01S 19/40* (2010.01)
*G01S 19/47* (2010.01)
*G01C 21/16* (2006.01)

(52) U.S. Cl.
CPC .............. *G01S 19/40* (2013.01); *G01S 19/47* (2013.01); *G01C 21/165* (2013.01)

(58) Field of Classification Search
CPC ....... G01S 19/40; G01S 19/47; G01C 21/165; G01C 21/34; G01C 21/3611; G01C 21/3694; G01C 21/3697; G08G 1/161
See application file for complete search history.

(56) References Cited

U.S. PATENT DOCUMENTS

| | | | | |
|---|---|---|---|---|
| 5,872,539 A * | 2/1999 | Mullen | ................... | G01S 19/08 342/357.31 |
| 9,128,170 B2 * | 9/2015 | Chu | ........................ | G01C 21/30 |
| 2002/0068997 A1 * | 6/2002 | Agashe | ................... | G01S 19/07 701/4 |
| 2002/0145557 A1 * | 10/2002 | Roy | ........................ | G01S 19/09 342/357.29 |
| 2003/0046633 A1 * | 3/2003 | Jutzi | ..................... | H04L 1/0041 714/774 |
| 2010/0017009 A1 * | 1/2010 | Baseman | ........... | G05B 19/0428 700/109 |
| 2010/0052944 A1 * | 3/2010 | Luke | ..................... | B60W 30/02 340/903 |
| 2011/0285583 A1 * | 11/2011 | Huang | .................... | G01S 19/40 342/357.23 |
| 2011/0316736 A1 * | 12/2011 | Mattos | .................... | G01S 19/05 342/357.25 |
| 2012/0146847 A1 * | 6/2012 | Janky | ...................... | G01S 19/43 342/357.23 |
| 2012/0265439 A1 * | 10/2012 | Radner | .................. | G01C 21/28 701/468 |
| 2014/0277831 A1 * | 9/2014 | Hunt | ...................... | G07C 5/008 701/1 |
| 2016/0282860 A1 * | 9/2016 | Freese | .................... | B60K 35/00 |

FOREIGN PATENT DOCUMENTS

| | | | | |
|---|---|---|---|---|
| JP | EP 1596330 A2 * | 11/2005 | ............... | G06K 9/32 |
| WO | WO 2011099599 A1 * | 8/2011 | ......... | B23Q 11/0007 |
| WO | WO 2011158885 A1 * | 12/2011 | ............. | G01B 11/03 |

* cited by examiner

*Primary Examiner* — Tuan C. To
(74) *Attorney, Agent, or Firm* — Lorenz & Kopf, LLP

(57) ABSTRACT

Methods and systems are provided for locating a vehicle. A locating device receives position data and determines an approximate position of the vehicle. A remote server reports a correction factor for each of a plurality of locations and a broadcast server broadcasts the correction factors over a wireless data stream. A receiver device receives the correction factors from the broadcast device and a correction device extracts a selected correction factor from the wireless data stream based on the location and the approximate position to determine a refined position of the vehicle.

20 Claims, 4 Drawing Sheets

SYSTEMS AND METHODS FOR LOCATING A VEHICLE

TECHNICAL FIELD

The technical field generally relates to positioning systems, and more particularly relates to methods and systems for locating a vehicle using correction factors to refine the determined location.

BACKGROUND

Vehicle locating systems are used to identify vehicle position for use in vehicle navigation systems. Current systems make use of Global Positioning Systems (GPS) to locate the vehicle relative to roads, points of interest (POI), and other features commonly found on maps. More generally, GPS is typically augmented with additional satellite navigation systems that operate in various countries and regions including Global Navigation Satellite System (GLONASS), Galileo Satellite Navigation, Beidou Navigation Satellite System, and Quasi-Zenith Satellite System (QZSS). The general term for using multiple constellations to compute a location is Global Navigation Satellite Systems (GNSS). Consumer GNSS systems are generally accurate to 10-50 feet 95% of the time, which is sufficient for general navigation purposes. However, this is not accurate to perform more advanced vehicle control that requires precise identification of vehicle position relative to other vehicles on the road.

Accordingly, it is desirable to provide systems and methods for locating a vehicle that refines the locating ability of a GNSS. It is additionally desirable to improve the performance of GNSS locating using correction factors that are received by the vehicle over a wireless data stream. Furthermore, other desirable features and characteristics of the present invention will become apparent from the subsequent detailed description and the appended claims, taken in conjunction with the accompanying drawings and the foregoing technical field and background.

SUMMARY

Systems and methods are provided for locating a vehicle. In one non-limiting example, a system for locating a vehicle includes, but is not limited to, a locating device on the vehicle that is configured to receive position data and determine an approximate position of the vehicle. The system further includes, but is not limited to, a remote server that is configured to report a correction factor for each of a plurality of locations. The system further includes, but is not limited to, a broadcast server that is configured to broadcast the correction factors over a wireless data stream. The system further includes, but is not limited to, a receiver device on the vehicle that is configured to receive the correction factors from the broadcast device over the wireless data stream. The system further includes, but is not limited to, a correction device on the vehicle that is configured to extract a selected correction factor from the wireless data stream based on the location and the approximate position and determine a refined position of the vehicle based on the selected correction factor and the approximate position.

In another non-limiting example, a vehicle includes, but is not limited to, a telematics control unit having a locating device that is configured to receive position data and determine an approximate position of the vehicle. The telematics control unit further includes, but is not limited to, a receiver device that is configured to receive a wireless data stream from a broadcast server, the wireless data stream containing a correction factor for each of a plurality of locations. The telematics control unit further includes, but is not limited to, a correction device configured to extract a selected correction factor from the wireless data stream based on the location and the approximate position and determine a refined position of the vehicle based on the selected correction factor and the approximate position.

In another non-limiting example, a method is provided for locating a vehicle. The method includes, but is not limited to, receiving position data with a locating device on the vehicle and determining an approximate position of the vehicle based on the position data. The method further includes, but is not limited to, broadcasting a wireless data stream from a broadcast server, the wireless data stream including a correction factor for each of a plurality of locations and receiving the wireless data stream with a receiver device on the vehicle. The method further includes, but is not limited to, extracting a selected correction factor from the wireless data stream based on the location and the approximate position and determining a refined location of the vehicle with a correction device on the vehicle, the refined location of the vehicle based on the selected correction factor and the approximate position.

DESCRIPTION OF THE DRAWINGS

The disclosed examples will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
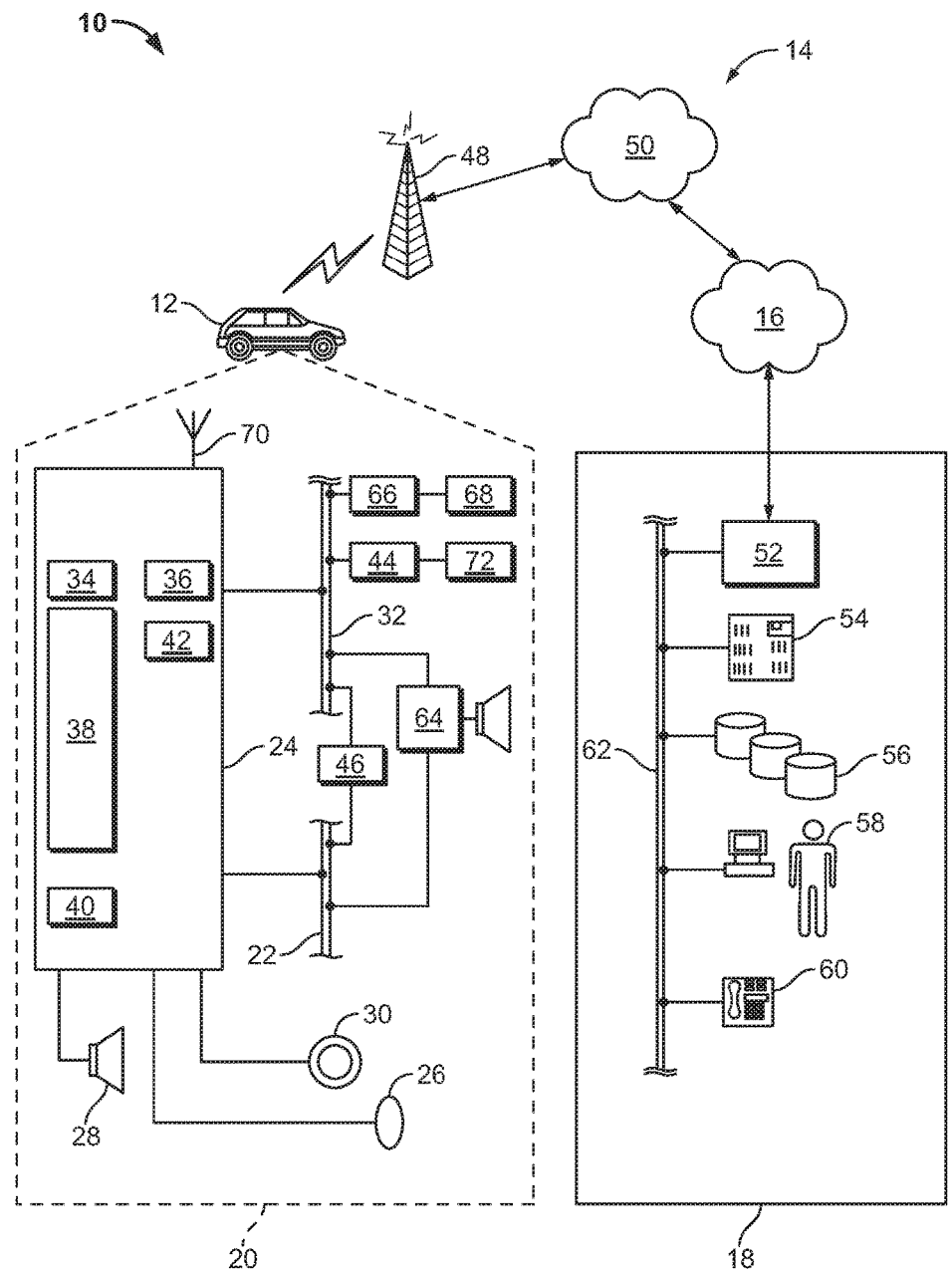
FIG. 1 is a diagram illustrating a non-limiting example of a communication system.

With reference to FIG. 1, there is shown a non-limiting example of a communication system 10 that may be used together with examples of the apparatus/system disclosed herein or to implement examples of the methods disclosed herein. Communication system 10 generally includes a vehicle 12, a wireless carrier system 14, a land network 16 and a call center 18. It should be appreciated that the overall architecture, setup and operation, as well as the individual components of the illustrated system are merely exemplary and that differently configured communication systems may also be utilized to implement the examples of the method disclosed herein. Thus, the following paragraphs, which provide a brief overview of the illustrated communication system 10, are not intended to be limiting.

Vehicle 12 may be any type of mobile vehicle such as a motorcycle, car, truck, recreational vehicle (RV), boat, plane, etc., and is equipped with suitable hardware and software that enables it to communicate over communication system 10. Some of the vehicle hardware 20 is shown generally in FIG. 1 including a telematics unit 24, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its communication with the call center 18, and generally includes an electronic processing device 38, one or more types of electronic memory 40, a cellular chipset/component 34, a wireless modem 36, a dual mode antenna 70, and a navigation unit containing a GNSS chipset/component 42. In one example, the wireless modem 36 includes a computer program and/or set of software routines adapted to be executed within electronic processing device 38.

The telematics unit 24 may provide various services including: turn-by-turn directions and other navigation-related services provided in conjunction with the GNSS chipset/component 42; airbag deployment notification and other emergency or roadside assistance-related services provided in connection with various crash and/or collision sensor interface modules 66 and collision sensors 68 located throughout the vehicle; and/or infotainment-related services where music, internet web pages, movies, television programs, videogames, and/or other content are downloaded by an infotainment center 46 operatively connected to the telematics unit 24 via vehicle bus 32 and audio bus 22. In one example, downloaded content is stored for current or later playback. The above-listed services are by no means an exhaustive list of all the capabilities of telematics unit 24, but are simply an illustration of some of the services that the telematics unit may be capable of offering. It is anticipated that telematics unit 24 may include a number of additional components in addition to and/or different components from those listed above.

Vehicle communications may use radio transmissions to establish a voice channel with wireless carrier system 14 so that both voice and data transmissions can be sent and received over the voice channel. Vehicle communications are enabled via the cellular chipset/component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), etc.

Dual mode antenna 70 services the GNSS chipset/component 42 and the cellular chipset/component 34.

Microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and call center 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with call center 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22.

The vehicle crash and/or collision detection sensor interface 66 is operatively connected to the vehicle bus 32. The collision sensors 68 provide information to the telematics unit via the crash and/or collision detection sensor interface 66 regarding the severity of a vehicle collision, such as the angle of impact and the amount of force sustained.

Vehicle sensors 72, connected to various sensor interface modules 44 are operatively connected to the vehicle bus 32. Example vehicle sensors include but are not limited to gyroscopes, accelerometers, magnetometers, emission detection, and/or control sensors, and the like. Example sensor interface modules 44 include powertrain control, climate control, and body control, to name but a few.

Wireless carrier system 14 may be a cellular telephone system or any other suitable wireless system that transmits signals between the vehicle hardware 20 and land network 16. According to an example, wireless carrier system 14 includes one or more cell towers 48

Land network 16 can be a conventional land-based telecommunications network that is connected to one or more landline telephones, and that connects wireless carrier system 14 to call center 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

Call center 18 is designed to provide the vehicle hardware 20 with a number of different system back-end functions and, according to the example shown here, generally includes one or more switches 52, servers 54, databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing. The modem or other telecommunication/computer equipment 60 may include an encoder, as previously explained, and can be connected to various devices such as a server 54 and database 56. For example, database 56 could be designed to store subscriber profile records, subscriber behavioral patterns, or any other pertinent subscriber information. Although the illustrated example has been described as it would be used in conjunction with a call center 18 that is manned, it will be appreciated that the call center 18 can be any central or remote facility, manned or unmanned, mobile or fixed, to or from which it is desirable to exchange voice and data.

Figure 2:
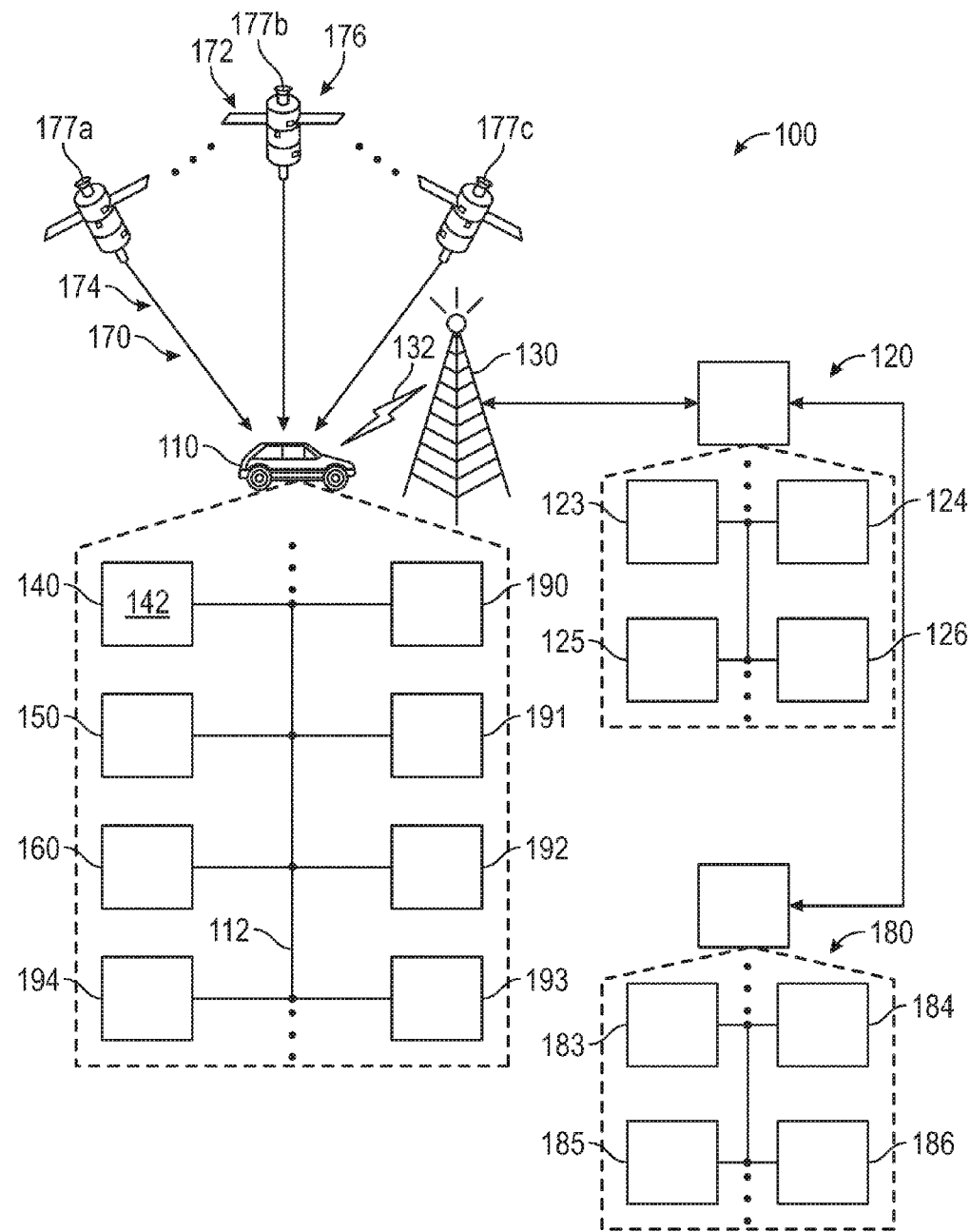
FIG. 2 is diagram illustrating a non-limiting example of a system for locating a vehicle according to an embodiment.

With reference to FIG. 2, there is shown a non-limiting example of a system 100 for locating a vehicle 110. It should be appreciated that the overall architecture, setup and operation, as well as the individual components of the illustrated system 100 are merely exemplary and that differently configured systems may also be utilized to implement the examples of the system 100 disclosed herein. Thus, the following paragraphs, which provide a brief overview of the illustrated system 100, are not intended to be limiting.

The system 100 generally includes the vehicle 110, a remote server 120, and a broadcast server 130. The term "server," as used herein, generally refers to electronic component, as is known to those skilled in the art, such as a computer program or a machine that waits for requests from other machines or software (clients) and responds to them. The vehicle 110 includes a locating device 140, a receiver device 150, and a correction device 160. The term "device," as used herein, generally refers to electronic component, as is known to those skilled in the art, and is not intended to be limiting. The remote server is configured to report a correction factor 123-126 for each of a plurality of locations. The broadcast server 130 is in communication with the remote server 120 and is configured to broadcast the correction factors 123-126 over a wireless data stream 132.

Vehicle 110 may be any type of mobile vehicle such as a motorcycle, car, truck, recreational vehicle (RV), boat, plane, etc., and is equipped with suitable hardware and software that enables it to communicate over the system 100. The locating device 140, receiver device 150, and correction device 160 are onboard the vehicle 110 and operatively coupled to a vehicle bus 112. Examples of suitable vehicle busses 112 include a controller area network (CAN), a media oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The locating device 140 is configured to receive position data 170 from a positioning network 172. In a non-limiting embodiment, the locating device 140 is a global navigation satellite system (GNSS) 142 that receives GNSS data 174 from a GNSS satellite network 176 including GNSS satellites 177a-c. One skilled in the art will appreciate that while a limited representation of the GNSS system 142 and the GNSS satellite network 176 is disclosed herein, this this disclosure will not limit the understanding of the system 100. Position data 170 is broadcasted from the positioning network 172 and in turn received by the locating device 140 onboard the vehicle 110. The locating device 140 uses the position data 170 to determine an approximate position of the vehicle 110.

The locating device 140 must align the GNSS data 174 broadcasted by GNSS satellites 177a-c of the GNSS satellite network 176 to an internally generated version of a pseudorandom binary sequence, also contained in the GNSS data 174. As the GNSS data 174 broadcasted by the GNSS satellite 177a travels to the vehicle 110, the GNSS data 174 takes time to reach the locating device 140. Since the GNSS data 174 takes time to reach the locating device 140, the two sequences do not initially coincide; the GNSS satellite's 174 copy is delayed in relation to the locating device's 140 copy. By increasingly delaying the locating device's 140 copy, the two copies can eventually be aligned. The correct delay represents the time needed for the GNSS data 174 to reach the locating device 140, and from this the distance from the GNSS satellite 177a can be calculated.

The accuracy of the resulting range measurement, and therefore the accuracy of the approximate position of the vehicle 110, is essentially a function of the ability of the locating device 140 to accurately process GNSS data 174 from the GNSS satellites 177a-c. However, error sources introduced into the GNSS data 174 such as non-mitigated ionospheric and tropospheric delays, multipath, satellite clock and ephemeris errors, etc., can negatively impact the range measurement made by the locating device 140 resulting in less accurate approximate position of the vehicle 110. The accuracy of GNSS positioning is generally given as "accurate to twenty feet," meaning that an actual position could be anywhere within a twenty foot radius of the determined position. For example, a GNSS position that is accurate to thirty feet is less accurate than a GNSS position that is accurate to ten feet.

Precise Point Positioning (PPP) satellite navigation uses instantaneous state corrections that are broadcasted for all satellite signals in view to allow for improved accuracy. The state corrections include corrections for satellite clock, satellite orbit, and ionospheric delays, and tropospheric delays, for example. The specific operation of PPP is not contemplated by this application, however, one skilled in the art will appreciate that some challenges of PPP can be addressed through the use of correction factors 123-126 that compensate for the errors introduced into the GNSS data 174 as discussed above. The generation of the correction factors 123-126 is likewise not contemplated by this application and in a non-limiting embodiment, the correction factors 123-126 may be provided by a third party service.

The correction factors 123-126 allow for improved accuracy when determining the position of the vehicle. However, each correction factor 123-126 is only useful within a specific location or geographic range. Stated differently by way of example, a vehicle 110 traveling in Detroit, Mich. would not want to use a correction factor that is specific to Paris, France. Accordingly, each of the correction factors 123-126 is associated with a location. In a non-limiting example, each correction factor 123-126 may be associated with a location area that is circular and approximately 20 miles in diameter. In a non-limiting example, the locations areas overlap such that as the vehicle 110 travels from one location area to another, the vehicle 110 is always located in an area having a correction factor 123-126.

The remote server 120 reports the correction factors 123-126 of each of the plurality of locations. While only four correction factors 123-126 are depicted in the remote server 120, one skilled in the art will appreciate that a greater number of correction factors 123-126 may be reported by the remote server 120 without departing from the spirit and the scope of the present application and, as such, the depiction herein is not intended to be limiting. The correction factors 123-126 may be updated in the remote server 120 as more accurate factors become available, as weather conditions change, etc., such that relevant and situationally accurate correction factors 123-126 are broadcasted.

The broadcast server 130 broadcasts the correction factors 123-126 over the wireless data stream 132 which is in turn received by the receiver device 150 on the vehicle 110. One skilled in the art will appreciate that the broadcast server 130 and the receiver device 150 are configured to communicate wirelessly such that the wireless data stream 132 may be received by the receiver device 150. In a non-limiting embodiment, the wireless data stream 132 is transmitted using any suitable encoding or modulation technique, including digital transmission technologies, such as TDMA (time division multiple access), CDMA (code division multiple access), W-CDMA (wideband CDMA), FDMA (frequency division multiple access), OFDMA (orthogonal frequency division multiple access), etc. In a non-limiting embodiment, the wireless data stream 132 is a single wireless data stream that includes all of the correction factors 123-126. Stated differently, in a non-limiting embodiment, the wireless data stream 132 broadcasted by the broadcast server 130 contains all of the correction factors 123-126 in the remote server 120.

The correction device 160 is in communication with the locating device 140 and the receiver device 150 over the vehicle bus 112. Using the approximate position of the vehicle 112 from the locating device 140, the correction device 160 extracts a selected correction factor from the wireless data stream 132. In a non-limiting example, the correction device 160 uses the approximate position of the vehicle to identify the location that includes the approximate position of the vehicle. For example, in a non-limiting example, if each of the locations are approximately 20 miles in diameter, the correction device 160 determines the location that covers the approximate position of the vehicle. In a non-limiting embodiment, the wireless data stream 132 includes location markers that indicate the location associated with each of the correction factors 123-126 broadcasted in the wireless data stream 132.

The correction device 160 determines a refined position of the vehicle 110 based on the selected correction factor and the approximate position of the vehicle 110. As detailed above, the correction factors 123-126 allow for improved accuracy when determining the refined position of the vehicle 110 by improving the measurements made with the GNSS data 174. In a non-limiting embodiment, the correction device 160 applies a correction filter to the GNSS data 174 based on the selected correction factor. In a non-limiting embodiment, the correction device 160 provides filtered GNSS data to the locating device 140 to determine the refined location.

In a non-limiting embodiment, the wireless data stream 132 includes all of the correction factors 123-126 that are valid for the entire planet. In a non-limiting embodiment, the correction device 160 extracts a selected correction factor from the planet wide correction factors 123-126 contained in the wireless data stream 132 based on the approximate position of the vehicle 112.

In a non-limiting embodiment, the correction device 160 is implemented a software application that is hosted on the electronics module (not shown) that includes the locating device 140 and the receiver device 150. Both the locating device 140 and the receiver device 150 provide real time data to the correction device 160, which runs continuously on the electronics module. In a non-limiting embodiment, the vehicle bus 112 reports the refined location to other vehicle systems on the vehicle bus 112.

In a non-limiting embodiment, the system 100 further includes an additional remote server 180 in communication with the remote server 120. The additional remote server 180 is configured to report additional correction factors 183-186 of each of the plurality of locations. While only four additional correction factors 183-186 are depicted in the additional remote server 180, one skilled in the art will appreciate that a greater number of additional correction factors 183-186 may be reported by the additional remote server 180 without departing from the spirit and the scope of the present application and, as such, the depiction herein is not intended to be limiting. The additional correction factors 183-186 may be updated in the additional remote server 180 as more accurate factors become available, as weather conditions change, etc., such that relevant and situationally accurate additional correction factors 183-186 are broadcasted by the broadcast server 130. The additional remote server 180 may be one of many servers in the system 100 to allow for the inclusion of more correction factors 123-126, 183-186, or to improve the robustness of the system 100.

In a non-limiting embodiment, the correction factors 123-126 are factors selected from the group consisting of: a satellite orbit correction factor, a satellite range factor, a model of satellite orbit model factor, an atomic clock correction factor, an ionosphere signal delay factor, a troposphere signal delay factor, or a combination thereof. In this way, the present disclosure contemplates that each of the correction factors 123-126 may contain any number of individual factors to be used in the determination of the refined location.

In a non-limiting embodiment, the vehicle 110 further includes a vehicle sensor 190-194 in communication with the bus 112 to provide sensor data to the correction device 160. In a non-limiting embodiment, the vehicle 110 includes a speedometer 190, a compass 191, an accelerometer 192, a vehicle control module 193, and an inertial navigation sensor 194. In a non-limiting embodiment, the sensor data includes a vehicle speed, a travel direction, a vehicle acceleration, inertial navigation data, etc., and the refined position is further determined based on the sensor data.

In a non-limiting embodiment, the vehicle 110 further includes a vehicle control system (not shown) which is provided with the refined location. In a non-limiting embodiment, the vehicle control system includes a cruise control system, a navigation system, an autonomous driving system, a vehicle to vehicle communication system, a platoon guidance system, or a combination thereof.

Figure 3:
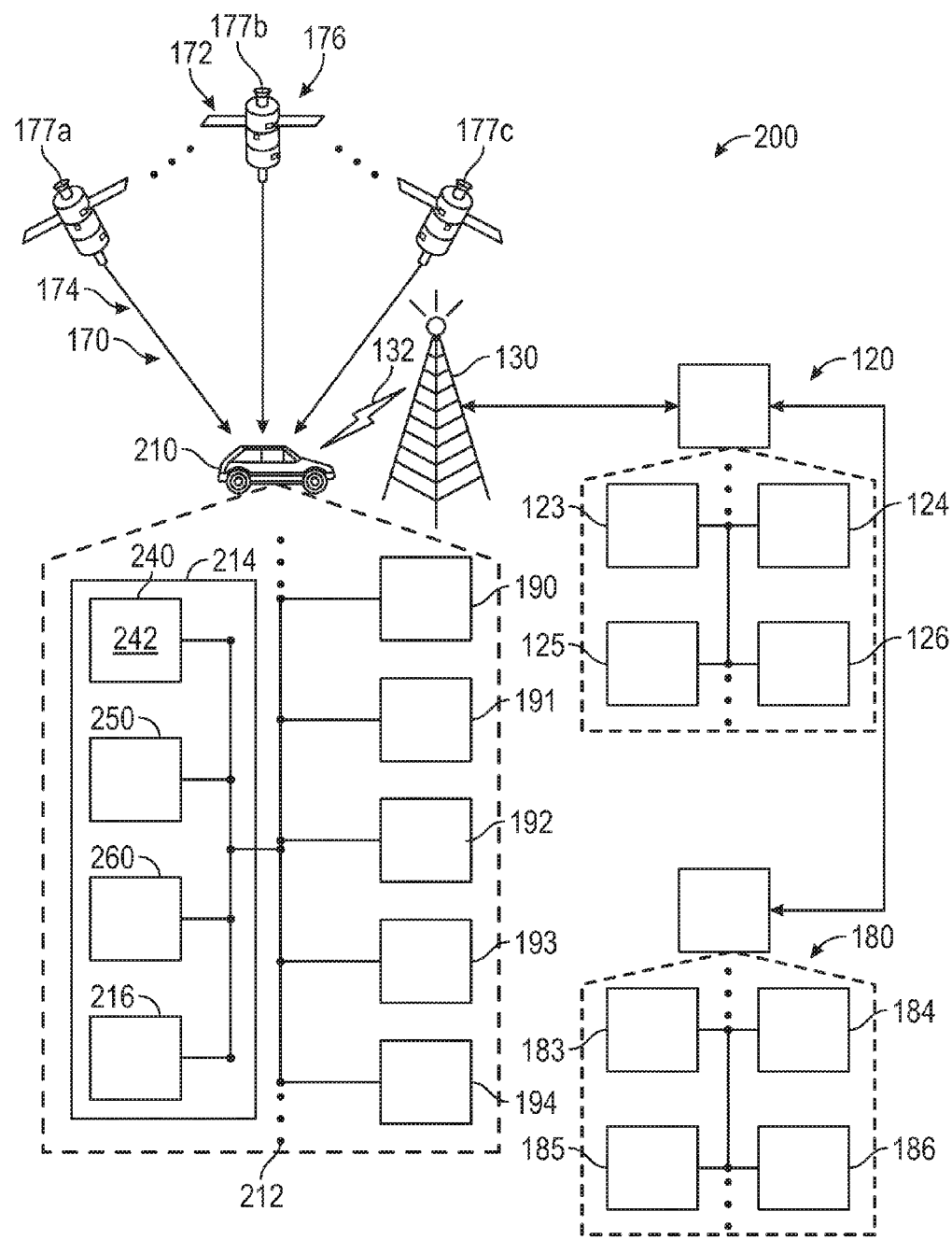
FIG. 3 is a diagram illustrating a non-limiting example of a system for locating a vehicle according to another embodiment.

With reference now to FIG. 3 and with continued reference to FIG. 2, there is shown a non-limiting example of a system 200 for locating a vehicle 210. It should be appreciated that the overall architecture, setup and operation, as well as the individual components of the illustrated system 200 are merely exemplary and that differently configured systems may also be utilized to implement the examples of the system 200 disclosed herein. Thus, the following paragraphs, which provide a brief overview of the illustrated system 200, are not intended to be limiting. As similar components are used in the system 200 relative to the system 100, similar reference numerals will be used and the description of system 200 will focus on the differences relative to the system 100.

The system 200 generally includes the vehicle 210, the remote server 120, and the broadcast server 130. The vehicle 210 includes a telematics control unit 214. Further to the telematics unit 24 of FIG. 1, the telematics control unit 214 includes a locating device 240, a receiver device 250, a correction device 260, and a vehicle control system 216. The remote server is configured to report a correction factor 123-126 for each of a plurality of locations. The broadcast server 130 is in communication with the remote server 120 and is configured to broadcast the correction factors 123-126 over a wireless data stream 132.

Vehicle 210 may be any type of mobile vehicle such as a motorcycle, car, truck, recreational vehicle (RV), boat, plane, etc., and is equipped with suitable hardware and software that enables it to communicate over the system 200. The locating device 240, receiver device 250, correction device 260, and vehicle control system 216 are onboard the vehicle 210 and operatively coupled to a vehicle bus 212. Examples of suitable vehicle busses 212 include a controller area network (CAN), a media oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The locating device 240 is configured to receive position data 170 from the positioning network 172. In a non-limiting embodiment, the locating device 240 is the global navigation satellite system (GNSS) 242 that receives GNSS data 174 from the GNSS satellite network 176 including GNSS satellites 177*a-c*. One skilled in the art will appreciate that while a limited representation of the GNSS system 242 and the GNSS satellite network 176 is disclosed herein, this disclosure will not limit the understanding of the system 200. Position data 170 is broadcasted from the positioning network 172 and in turn received by the locating device 240 onboard the vehicle 210. The locating device 240 uses the position data 170 to determine an approximate position of the vehicle 210.

The remote server 120 reports the correction factors 123-126 of each of the plurality of locations. While only four correction factors 123-126 are depicted in the remote server 120, one skilled in the art will appreciate that a greater number of correction factors 123-126 may be reported by the remote server 120 without departing from the spirit and the scope of the present application and, as such, the depiction herein is not intended to be limiting. The correction factors 123-126 may be updated in the remote server 120 as more accurate factors become available, as weather conditions change, etc., such that relevant and situationally accurate correction factors 123-126 are broadcasted.

The broadcast server 130 broadcasts the correction factors 123-126 over the wireless data stream 132 which is in turn received by the receiver device 250 on the vehicle 210. One skilled in the art will appreciate that the broadcast server 130 and the receiver device 250 are configured to communicate wirelessly such that the wireless data stream 132 may be received by the receiver device 250. In a non-limiting embodiment, the wireless data stream 132 is transmitted using any suitable encoding or modulation technique, including digital transmission technologies, such as TDMA (time division multiple access), CDMA (code division multiple access), W-CDMA (wideband CDMA), FDMA (frequency division multiple access), OFDMA (orthogonal frequency division multiple access), etc. In a non-limiting embodiment, the wireless data stream 132 is a single wireless data stream that includes all of the correction factors 123-126. Stated differently, in a non-limiting embodiment, the wireless data stream 132 broadcasted by the broadcast server 130 contains all of the correction factors 123-126 in the remote server 120.

The correction device 260 is in communication with the locating device 240, the receiver device 250, and the vehicle control system 216 over the vehicle bus 212. Using the approximate position of the vehicle 212 from the locating device 240, the correction device 260 extracts a selected correction factor from the wireless data stream 132. In a non-limiting example, the correction device 260 uses the approximate position of the vehicle to identify the location that includes the approximate position of the vehicle. For example, in a non-limiting example, if each of the locations are approximately 20 miles in diameter, the correction device 260 determines the location that covers the approximate position of the vehicle. In a non-limiting embodiment, the wireless data stream 132 includes location markers that indicate the location associated with each of the correction factors 123-126 broadcasted in the wireless data stream 132.

The correction device 260 determines a refined position of the vehicle 210 based on the selected correction factor and the approximate position of the vehicle 210. As detailed above, the correction factors 123-126 allow for improved accuracy when determining the refined position of the vehicle 210 by improving the measurements made with the GNSS data 174. In a non-limiting embodiment, the correction device 260 applies a correction filter to the GNSS data 174 based on the selected correction factor. In a non-limiting embodiment, the correction device 260 provides filtered GNSS data to the locating device 240 to determine the refined location. In a non-limiting embodiment, the telematics receiver 214 provides telematics data, as discussed above, to the correction device 260.

In a non-limiting embodiment, the system 200 further includes an additional remote server 180 in communication with the remote server 120. The additional remote server 180 is configured to report additional correction factors 183-186 of each of the plurality of locations. While only four additional correction factors 183-186 are depicted in additional remote server 180, one skilled in the art will appreciate that a greater number of additional correction factors 183-186 may be reported by the additional remote server 180 without departing from the spirit and the scope of the present application and, as such, the depiction herein is not intended to be limiting. The additional correction factors 183-186 may be updated in the additional remote server 180 as more accurate factors become available, as weather conditions change, etc., such that relevant and situationally accurate additional correction factors 183-186 are broadcasted by the broadcast server 130. The additional remote server 180 may be one of many servers in the system 200 to allow for the inclusion of more correction factors 123-126, 183-186, or to improve the robustness of the system 100.

In a non-limiting embodiment, the correction factors 123-126 are factors selected from the group consisting of: the satellite orbit correction factor, the satellite range factor, the model of satellite orbit model factor, the atomic clock correction factor, the ionosphere signal delay factor, the troposphere signal delay factor, or a combination thereof. In this way, the present disclosure contemplates that each of the correction factors 123-126 may contain any number of individual factors to be used in the determination of the refined location.

In a non-limiting embodiment, the vehicle 210 further includes vehicle sensors 190-194 in communication with the bus 212 to provide sensor data to the correction device 260. In a non-limiting embodiment, the vehicle 210 includes the speedometer 190, the compass 191, the accelerometer 192, the vehicle control module 193, and the inertial navigation sensor 194. In a non-limiting embodiment, the sensor data includes the vehicle speed, the travel direction, the vehicle acceleration, inertial navigation data, etc., and the refined position is further determined based on the sensor data.

In a non-limiting embodiment, the vehicle control system 216 is provided with the refined location. In a non-limiting embodiment, the vehicle control 216 system includes a cruise control system, a navigation system, an autonomous driving system, a vehicle to vehicle communication system, a platoon guidance system, or a combination thereof.

Figure 4:
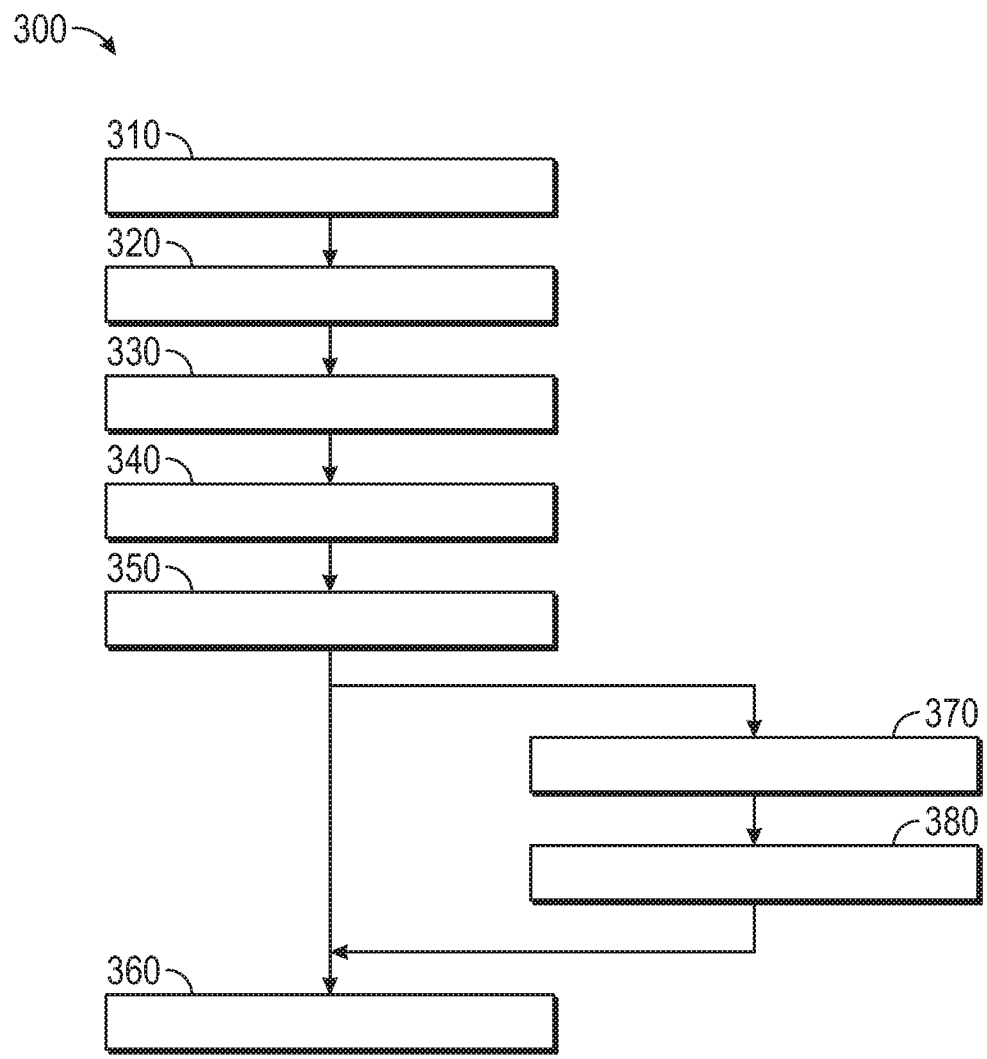
FIG. 4 is a flowchart illustrating a non-limiting example of a method for locating a vehicle.

Referring now to FIG. 4, and with continued reference to FIGS. 2 and 3, a flowchart illustrates a method performed by the systems 100, 200 for locating a vehicle in accordance with the present disclosure. As can be appreciated in light of the disclosure, the order of operation within the method 300 is not limited to the sequential execution as illustrated in FIG. 4, but may be performed in one or more varying orders as applicable and in accordance with the requirements of a given application.

In various exemplary embodiments, the systems 100, 200 and method 300 are run based on predetermined events, and/or can run continuously during operation of the vehicle 110, 210. The method 300 starts at 310 with receiving position data 170 with the locating device 140, 240. At 320, the method 300 determines the approximate position of the vehicle 110, 210, based on the position data 170. At 330 the wireless data stream 132 is broadcasted from the broadcast server 130. As detailed above, the wireless data stream 132 includes the correction factors 123-126, 183-186 for each of the plurality of locations.

At 340 the receiver device 150, 250 receives the wireless data stream 132 and at 350 the selected correction factor is extracted from the wireless data stream 132 based on the location and the approximate position. At 360, the correction device 160, 260 determines the refined position of the vehicle 110, 210 based on the selected correction factor and the approximate position. The method 300 then proceeds to 310 determine another refined position as necessary.

In a non-limiting embodiment, the vehicle 110, 210 further includes vehicle sensors 190-194 to provide sensor data to the correction device 160, 260. In a non-limiting embodiment, after 350, the method 300 proceeds to 370 and sensor data is generated by the vehicle sensor 190-194. At 380, the sensor data is provided to the correction device 160, 260. After 380, the method 300 proceeds to 360 and determines the refined position based on the sensor data, the approximate position, and the selected correction factor.

In a non-limiting embodiment, the wireless data stream 132 broadcasted at 330 is a single wireless data stream that includes all of the correction factors 123-126, 183-186. In a non-limiting embodiment, the correction factors 123-126, 183-186 transmitted in the wireless data stream 132 at 33 are factors selected from the group consisting of: the satellite orbit correction factor, the satellite range factor, the model of satellite orbit model factor, the atomic clock correction factor, the ionosphere signal delay factor, the troposphere signal delay factor, or a combination thereof. In this way, the present disclosure contemplates that each of the correction factors 123-126, 183-186 may contain any number of individual factors to be used in the determination of the refined location While various exemplary embodiments have been presented in the foregoing detailed description, it should be appreciated that a vast number of variations exist. It should also be appreciated that the exemplary embodiments are only examples, and are not intended to limit the scope, applicability, or configuration of the disclosure in any way. Rather, the foregoing detailed description will provide those skilled in the art with a convenient road map for implementing the exemplary embodiments. It should be understood that various changes can be made in the function and arrangement of elements without departing from the scope of the disclosure as set forth in the appended claims and the legal equivalents thereof.

The invention claimed is:

1. A system for locating a vehicle comprising:
a locating device on the vehicle configured to receive position data and determine an approximate position of the vehicle;
a remote server configured to report a correction factor for each of a plurality of locations;
a broadcast server configured to broadcast the correction factors over a wireless data stream;
a receiver device on the vehicle configured to receive the correction factors from the broadcast device over the wireless data stream; and
a correction device on the vehicle configured to extract a selected correction factor from the wireless data stream based on the location and the approximate position and determine a refined position of the vehicle based on the selected correction factor and the approximate position.

2. The system of claim 1, wherein the wireless data stream consists of a single wireless data stream that includes all of the correction factors.

3. The system of claim 1, wherein the locating device comprises a global navigation satellite system.

4. The system of claim 1, wherein the correction factor is selected from the group consisting of: a satellite orbit correction factor, a satellite range factor, a model of satellite orbit model factor, an atomic clock correction factor, an ionosphere signal delay factor, a troposphere signal delay factor, or a combination thereof.

5. The system of claim 1, further comprising a vehicle sensor configured to provide sensor data to the correction device, the sensor data including at least one of a vehicle speed, a travel direction, and a vehicle acceleration, wherein the refined position is determined based on the sensor data.

6. The system of claim 5, wherein the vehicle sensor comprises an inertial navigation sensor configured to generate sensor data in the form inertial navigation data.

7. The system of claim 1, wherein the position data comprises a global navigation satellite signal and the correction device filters the position data based on the selected correction factor.

8. A vehicle comprising:
a telematics control unit comprising:
a locating device configured to receive position data and determine an approximate position of the vehicle;
a receiver device configured to receive a wireless data stream from a broadcast server, the wireless data stream containing a correction factor for each of a plurality of locations; and
a correction device configured to extract a selected correction factor from the wireless data stream based on the location and the approximate position and determine a refined position of the vehicle based on the selected correction factor and the approximate position.

9. The vehicle of claim 8, wherein the wireless data stream consists of a single wireless data stream that includes all of the correction factors.

10. The vehicle of claim 8, wherein the locating device comprises a global navigation satellite system.

11. The vehicle of claim 8, wherein the correction factor is selected from the group consisting of: a satellite orbit correction factor, a satellite range factor, a satellite orbit model factor, an atomic clock correction factor, an ionosphere signal delay factor, a troposphere signal delay factor, or a combination thereof.

12. The vehicle of claim 8, further comprising a vehicle sensor configured to provide sensor data to the correction device, the sensor data including at least one of a vehicle speed, a travel direction, and a vehicle acceleration, wherein the refined position is determined based on the sensor data.

13. The vehicle of claim 12, wherein the vehicle sensor comprises an inertial navigation sensor configured to generate sensor data in the form inertial navigation data.

14. The vehicle of claim 8, wherein the position data comprises a global navigation satellite signal and the correction device filters the position data based on the selected correction factor.

15. The vehicle of claim 8, further comprising a vehicle control system, wherein the vehicle control system is provided with the refined location.

16. The vehicle of claim 15, wherein the vehicle control system includes at least one of a cruise control system, a navigation system, an autonomous driving system, a vehicle to vehicle communication system, and a platoon guidance system.

17. A method of locating a vehicle comprising:
receiving position data with a locating device on the vehicle;
determining an approximate position of the vehicle based on the position data;
broadcasting a wireless data stream from a broadcast server, the wireless data stream including a correction factor for each of a plurality of locations;
receiving the wireless data stream with a receiver device on the vehicle;
extracting a selected correction factor from the wireless data stream based on the location and the approximate position; and
determining a refined location of the vehicle with a correction device on the vehicle, the refined location of the vehicle based on the selected correction factor and the approximate position.

18. The method of claim 17, wherein the wireless data stream consists of a single wireless data stream that includes all of the correction factors.

19. The method of claim 17, wherein the correction device filters the position data based on the selected correction factor selected from the group consisting of: a satellite orbit correction factor, a satellite range factor, a satellite orbit model factor, an atomic clock correction factor, an ionosphere signal delay factor, a troposphere signal delay factor, or a combination thereof.

20. The method of claim 17, further comprising:
generating sensor data with a vehicle sensor, the sensor data including at least one of a vehicle speed, a travel direction, and a vehicle acceleration;
providing the correction device with the sensor data; and
determining the refined position based on the sensor data.

* * * * *